(12) United States Patent
Phan

(10) Patent No.: US 7,215,347 B2
(45) Date of Patent: *May 8, 2007

(54) DYNAMIC PIXEL RESOLUTION, BRIGHTNESS AND CONTRAST FOR DISPLAYS USING SPATIAL ELEMENTS

(76) Inventor: Gia Chuong Phan, Park Avenue, Block 7, Flat 3A, 18 Hoiting Road, Kowloon (HK)

( * ) Notice: Subject to any disclaimer, the term of this patent is extended or adjusted under 35 U.S.C. 154(b) by 347 days.

This patent is subject to a terminal disclaimer.

(21) Appl. No.: 10/339,491

(22) Filed: Jan. 10, 2003

(65) Prior Publication Data

US 2003/0218618 A1 Nov. 27, 2003

Related U.S. Application Data

(63) Continuation-in-part of application No. 09/151,287, filed on Sep. 11, 1998, now Pat. No. 6,661,429.

(30) Foreign Application Priority Data

Sep. 13, 1997 (DE) ................................ 197 41 132

(51) Int. Cl.
*G09G 5/02* (2006.01)
(52) U.S. Cl. .................................... 345/694
(58) Field of Classification Search ................ 345/33, 345/38, 40, 42–44, 47, 48, 55, 63, 77, 90, 345/112, 113, 116, 132–136, 149, 150, 152–154, 345/690, 694
See application file for complete search history.

(56) References Cited

U.S. PATENT DOCUMENTS 5,113,274 A  *  5/1992  Takahashi et al. .......... 349/109
5,311,337 A       5/1994  McCartney, Jr.
5,341,153 A       8/1994  Benzschawel et al.
5,525,873 A  *  6/1996  Lambert et al. ............ 315/368
5,530,570 A       6/1996  Terumoto
5,767,837 A  *  6/1998  Hara .......................... 345/694
6,219,025 B1     4/2001  Hill et al.
6,239,783 B1     5/2001  Hill et al.
6,326,981 B1    12/2001  Mori et al.
6,661,429 B1 * 12/2003  Phan .......................... 345/694

FOREIGN PATENT DOCUMENTS

DE    36 06 404 A1    9/1986
EP    0 637 009 A2    2/1995
JP    04154512    *    5/1992

* cited by examiner

*Primary Examiner*—Kee M. Tung
*Assistant Examiner*—J. F. Cunningham
(74) *Attorney, Agent, or Firm*—Birch, Stewart, Kolasch & Birch, LLP

(57) ABSTRACT

Display comprises static pixels and dots (individual element) arranged in a predetermined manner. Dynamic pixels are generated dynamically, comprising dots selected from at least two adjacent static pixels. Overlapping of dynamic pixels on the static pixels creates an enhanced resolution at the human's eyes.

By adjusting the light emitting area and space of dots in a static pixel, maximum optimized brightness in a white balance equilibrium with good contrast can be obtained in finding an optimal ratio between the non light emitting area (black mask or black barrier ribs) and the light emitting area.

31 Claims, 10 Drawing Sheets

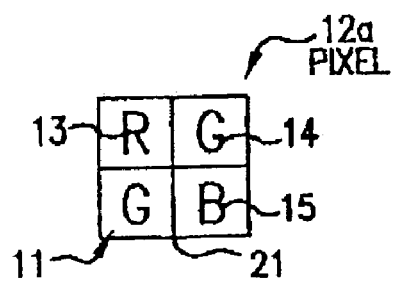 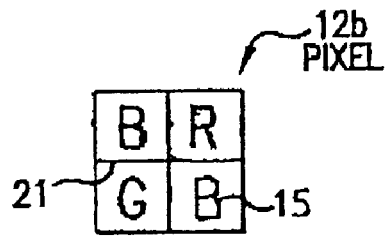 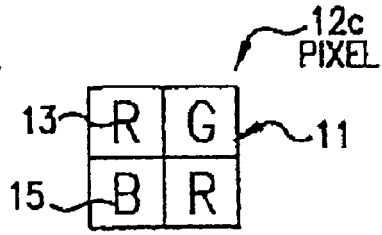
FIG.1a  FIG.1b  FIG.1c
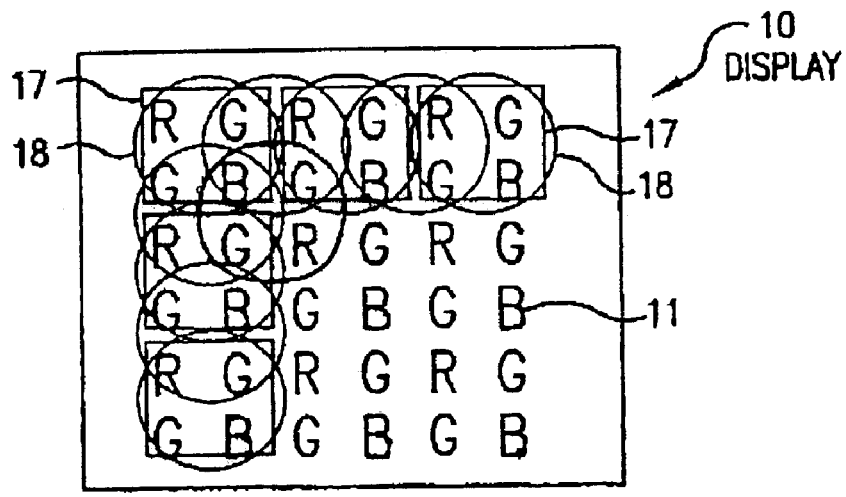
FIG.2a
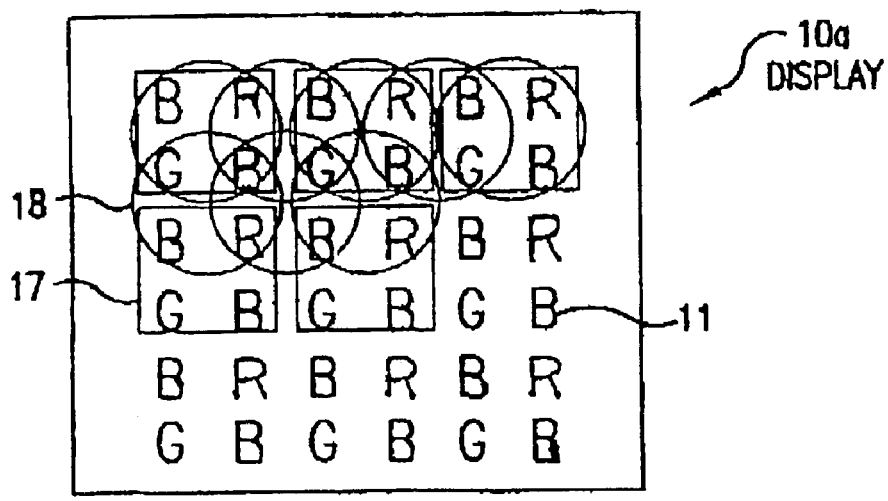
FIG.2b

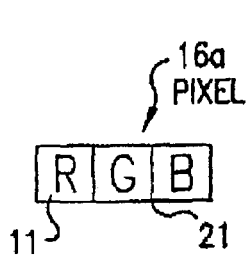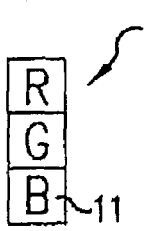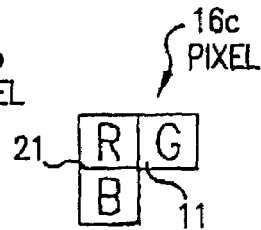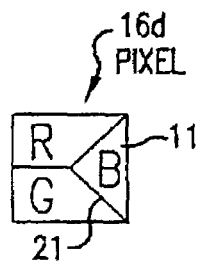
FIG.3a  FIG.3b  FIG.3c  FIG.3d
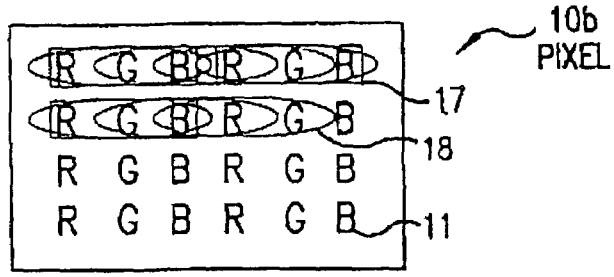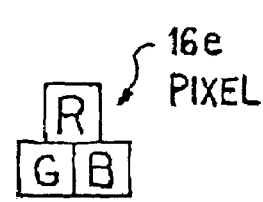
FIG.4a  FIG.3e
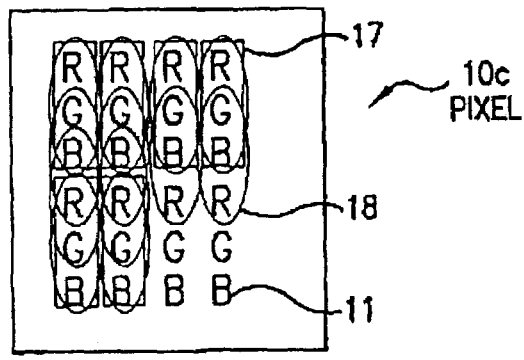
FIG.4b
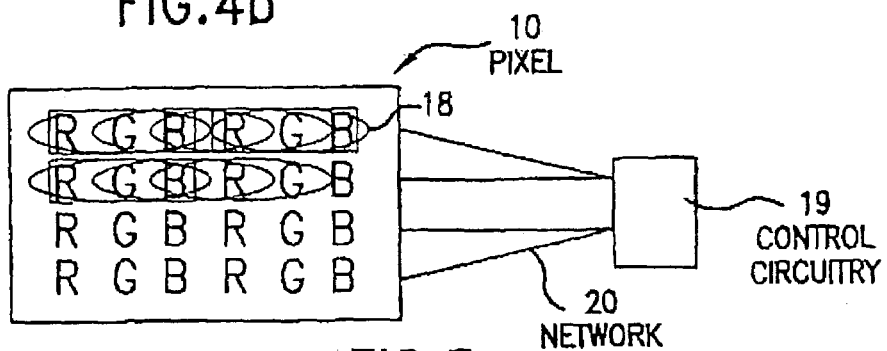
FIG.5

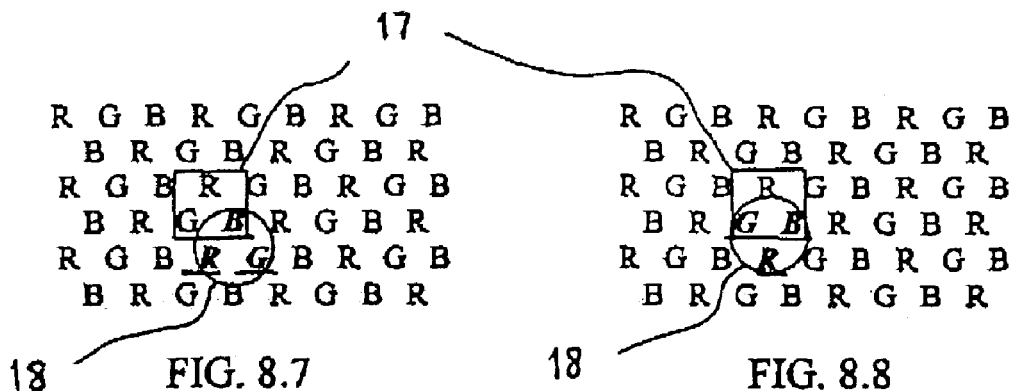
FIG. 8.7  FIG. 8.8
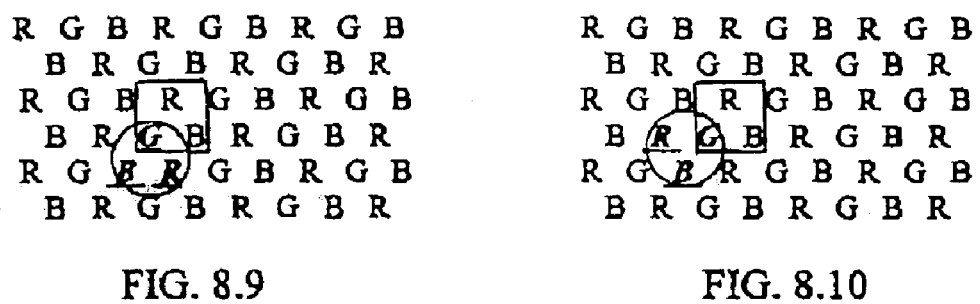
FIG. 8.9  FIG. 8.10
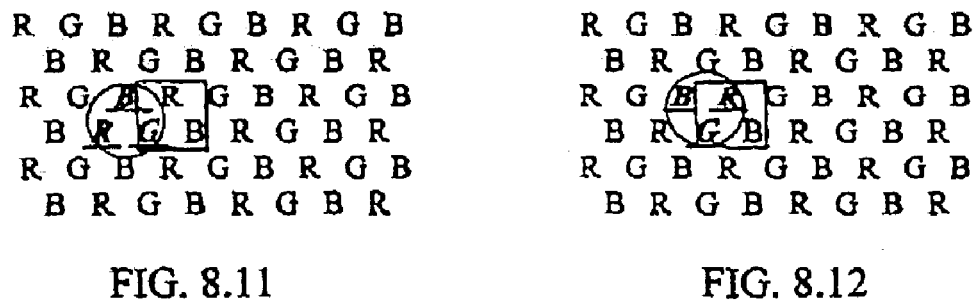
FIG. 8.11  FIG. 8.12

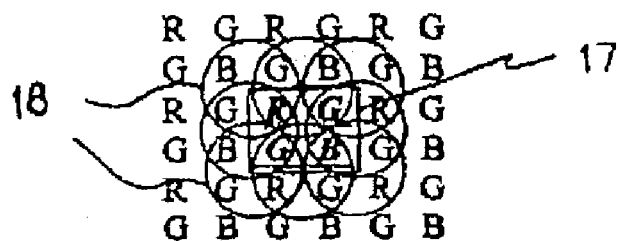
FIG. 9
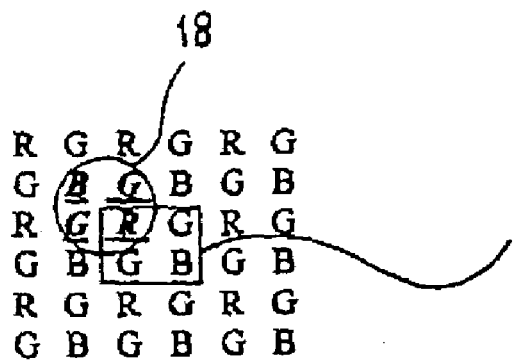
FIG. 9.1
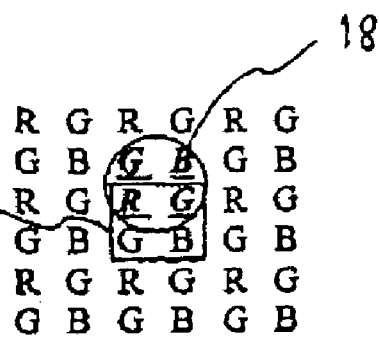
FIG. 9.2
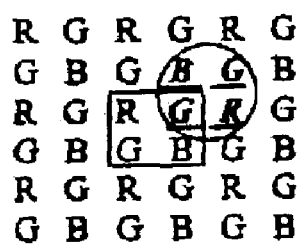
FIG. 9.3
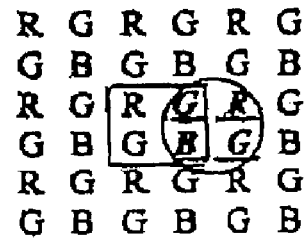
FIG. 9.4
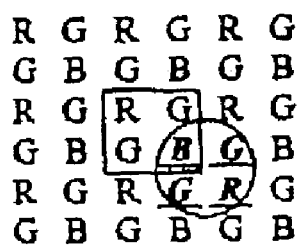
FIG. 9.5
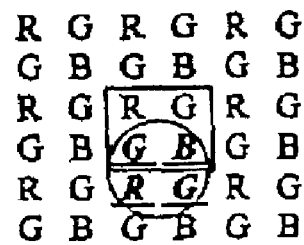
FIG. 9.6

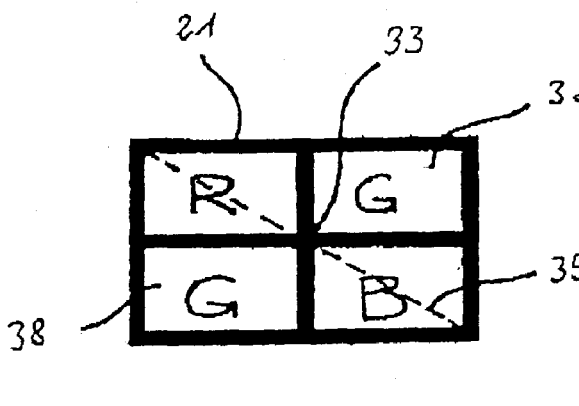
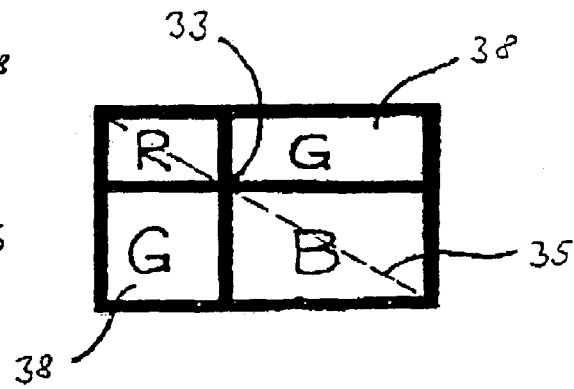
FIG. 9.7  FIG. 9.8
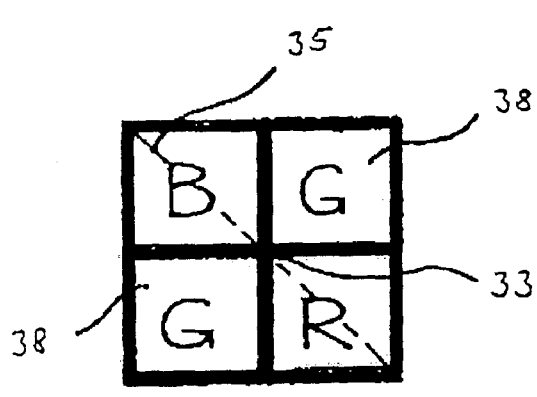
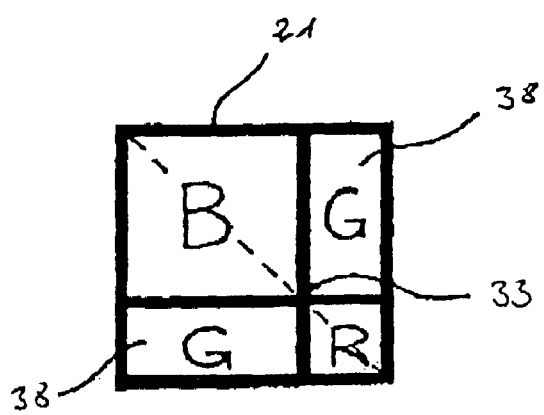
FIG. 10a  FIG 10b
FIG. 11a  FIG 11b Quad pixels Display with 480 x 640 static pixels resolution and 959 x 1279 inventive dynamic pixels resolution

DYNAMIC PIXEL RESOLUTION, BRIGHTNESS AND CONTRAST FOR DISPLAYS USING SPATIAL ELEMENTS

CROSS-REFERENCE TO RELATED APPLICATIONS

This is a continuation-in-part of U.S. patent application Ser. No. 09/151,287, filed Sep. 11, 1998 now U.S. Pat. No. 6,661,429, and claims priority under 35 U.S.C. §119 and 37 C.F.R. §1.55(a) of German Application No. 197 41 132.0, filed Sep. 13, 1997.

BACKGROUND OF THE INVENTION

The invention relates to a display comprising pixels and dots, including but not limited to the following display technologies: Cathode Ray Tube (CRT), Field Emission Display (FED), Vacuum Florescent Display (VFD), Plasma Display Panel (PDP), Liquid Crystal Display (LCD), Light Emitting Diode (LED), Organic Light Emitting Diode (OLED), Polymer Light Emitting Diode (PLED), Electroluminescence (EL), Electronic ink as well as a method for controlling the (said) display.

It is another objective of the present invention to adjust the light emitting area and space of different individual elements in a pixel contoured by black mask or barrier ribs of the same structure to optimize the luminance and the brightness of a display.

It is further objective of the present invention to provide a method to display high resolution video source like HDTV in a dynamic high resolution enhanced display of the present invention. Further to provide a method to display upscaling low resolution video source like SDTV, to be displayed on a dynamic high resolution enhanced display of the present invention.

It is another objective of the present invention to provide a dual mode (HDTV video mode and Computer text mode) in an HDTV enable WebTV for internet browsing as well as for watching HDTV quality video.

SUMMARY OF THE INVENTION

The invention relates to a display comprising pixels and dots, as well as a method of controlling said display.

In known display of the kind used in video, film and computer technology, so-called pixels are arranged along horizontally and/or vertically extending lines. The pixels generally consist of so-called dots representing the three basic colours red, green and blue. Dots are sources of luminous radiation the light of which is mixed to generate luminous mixed colours in a process referred to as additive mixing.

In computer monitors and television receivers the display is divided into a plurality of pixels arranged on a fixed grid or raster. Each pixel is controlled individually, with the pixels addressed from left to right and from the top to the bottom, for instance, as is customary practice for CRT screens.

EP 0 637 009 A2 discloses a method of controlling active LCD displays in which the dots are arranged in a mutually offset pattern to form a delta shape, with the dots of each colour group vertically interconnected by a control line. Horizontal control is effected pixelwise, meaning that the three dots of each RGB pixel are addressed at the same time. Further, each dot comprises a memory element and a switching element, whereby RGB data can be transmitted using synchronizing information, as is the case in conventional monitors, for example.

DE 36 06 404 A1 discloses a method of generating picture elements on a colour display, as well as a colour display. The method uses a light gate array of which the light gates are addressable individually by means of control circuitry in such a manner that the desired colour intensity is obtained by controlling the transmission properties of the respective light gate. Light sources are disposed behind the light gate to provide at least two primary colours and are switched in alternating light cycles at a repetition rate of at least 25 Hz, with the light gates being controlled synchronously therewith. Because of the inertia of the human eye, it is possible for a gate to display the desired colour.

One drawback of this kind of display is that the number of pixels is limited by the fixed grid, which limits the resolution and the picture sharpness as well. The finer the grid, the higher the resolution. The fineness of the grid itself is limited by manufacturing technology, however, because the cathode ray tubes that are used for the displays comprise so-called shadow masks having holes therein which cannot be reduced to whatever size unless one puts up with considerable expenditures.

Likewise, in LCD displays, the integration of a great number of transistors is extremely expensive and very prone to produce major amounts of rejects. In Plasma (PDP) or in FED displays, the technical and economical manufactured size of a RGB pixel is physically limited by the mass production technology itself and further reduction of the RGB pixel size for higher resolution cannot be achieved without huge manufacturing equipment cost and over proportional scraps which are economically not viable.

In LED displays, the placement of the LEDs is complicated and expensive as their space demand is predetermined by their shape.

It is the object of the present invention to provide a display of the aforesaid kind which has a higher optical resolution for a given grid.

The above object is achieved by a variable generation of pixels from existing dots, said pixels forming a dynamically generated logical unit by grouping adjacent dots so that adjacent pixels are physically superimposed. In the process, said generation of the dynamic pixels takes place at a rate high enough not to be perceivable by the human eye.

A dynamic pixel is supposed to consist of at least as many dots that it comprises all the basic colours given by those dots.

It is another object of the present invention to provide a method which enables an enhanced resolution to be obtained for dot-addressed displays.

This object is achieved specifically by a dynamic generation of pixels wherein a one-pixel logical unit is formed by grouping adjacent dots, with adjacent pixels being physically superimposed and the dynamic pixels being generated by sequential addressing at a rate such that said generation is not perceivable by the human eye.

When selected to be assembled into a group, the dots are chosen so that adjacent pixels overlap partly only. As a result, another dynamic pixel will be formed between existing, normally static pixels. The pixels are combined in a manner such as to comprise all basic colours provided by the dots.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be come apparent to those skilled in the art from the is detailed description.

BRIEF DESCRIPTION OF THE DRAWINGS

Further advantageous measures are described in the dependent claims. The invention is shown in the attached drawing and is described hereinafter in greater detail.

FIGS. 1a–c show various forms of arranging four dots within a square pixel;

FIGS. 2a–b show various embodiments of a display with square pixels, with the well-known static pixels being shown within squares and the dynamic pixels of the invention within circles;

FIGS. 3a–e show various forms of a pixel comprising the three basic colour dots red, green and blue;

FIGS. 4a–b show various forms of a display featuring different pixel forms, with the well-known static pixels shown within squares and the dynamic pixels of the present invention shown in oval shapes;

FIG. 5 shows a display addressed by control circuitry connected to the dot via a network;

FIGS. 8.1–8.12 show twelve dynamic delta pixels sharing common dots (individual elements) with a static delta pixel;

FIG. 9 shows a quad pixels display;

FIGS. 9.1–9.8 show eight dynamic quad pixels sharing common dots (individual elements) with a static quad pixel;

FIG. 10a shows a rectangle quad pixel where the crosspoint 33 is in the centre of the four dots (individual elements) of equal light emitting area and space, contoured by black mask or black barrier ribs with the same structure;

FIG. 10b shows a typical rectangle quad pixel where the crosspoint moving along the diagonal line forms two dots (individual elements) of equal light emitting area and space of green color (G);

FIG. 11a shows a square quad pixel where the crosspoint is in the centre of the four dots (individual elements) of equal light emitting area and space, contoured by black mask or black barrier ribs with the same structure;

FIG. 11b shows a typical square quad pixel where the crosspoint moving along the diagonal line forms two dots (individual elements) of equal light emitting area and space of green color (G);

FIGS. 12a–12d show a sequence of four dynamic screen layers of 480×640 resolution each which are displayed and superimposed subsequently over a time frame in order to obtain an enhanced high resolution screen of 959×1279 dynamic pixels.

DETAILED DESCRIPTION OF THE PREFERRED EMBODIMENTS

Figure 6:
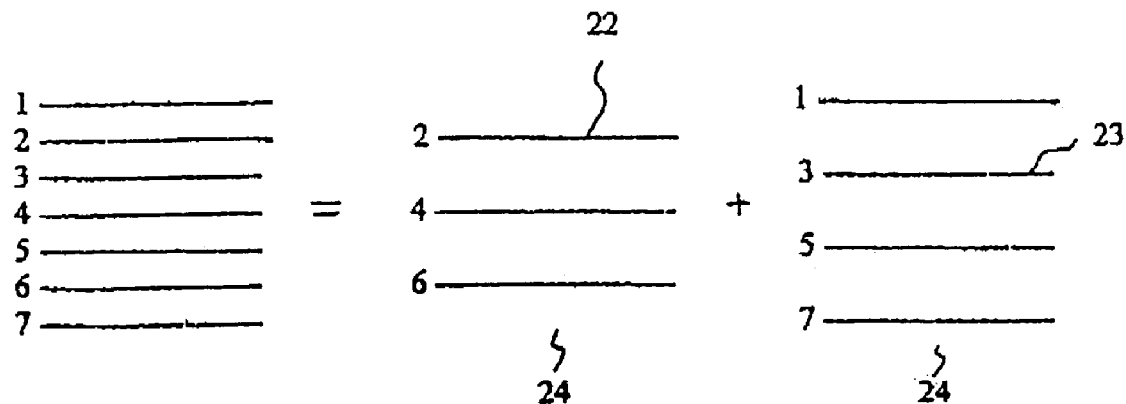
FIG. 6 shows the interlaced signal sequence in the generation of a frame from two fields.

As shown in FIGS. 1a to 1c, pixels 12a, 12b and 12c have a square shape. Pixels 12a, 12b and 12c comprise regularly disposed dots 11 radiating the basic colours red (red dot 13), green (green dot 14) and blue (blue dot 15).

In FIGS. 1b and 1c, we observe different dots arrangement in a quad pixel. Preferably, each dot 11 is surrounded by a black mask or black barrier ribs 21 to obtain a higher contrast between the dynamic pixels 18. The precise arrangement of the various colour dots 13, 14, 15 is not critical; care should be taken, however, that the arrangement of the different dots 13, 14, and 15 should be identical in each static pixel 17 within a display 10. As can be seen, the four individual dots in one pixel group having one of the colors red, green and blue with two of the dots having the same color. The two individual dots of the same color share equally the data of the said color data in a quad pixel group. FIGS. 2a and 2b show displays 10 and 10a having square static pixels 17. Static pixel 17 corresponds to a well known grid pattern or raster of display 10 or 10a. In each of the pixels 17 a light emitting area and space of each of the individual dots in a static pixel group being adjusted and optimized in order to obtain a maximum luminance in white balance equilibrium. Further, a determination of the light emitting area and space of each individual dot in a static pixel group depends on the light emission performance of the said individual element.

The dynamic pixels 18 shown in a circular form represent the inventive configuration of display 10 or 10a. Each dynamic pixel 18 comprises three dots 13, 14 and 15 representing the basic colours, as does each static pixel 17.

In contrast to static pixels 17, the dynamic pixels 17 overlap; they should not overly each other completely, however. High-frequency addressing of the dynamic pixels 18 will cause the human eye to be tricked into perceiving a more exact representation of the displayed picture, preferable at a rate of 100 Hz or higher.

In a display comprising rectangular pixels 12a, 12b, 12c, the resolution is increased by:

$$P=(x-1)\cdot y+(2x-1)*(y-1)$$

pixels, with x being the number of horizontal pixels and y the number of vertical pixels.

In the displays of FIGS. 2a and 2b, this value would be:

$$P=(3-1)*3+(2*3-1)*(3-1)=6+10=16$$

As a result, this display has a resolution of 25=16+9 instead of 9 points.

FIGS. 3a to 3e show various forms of pixels 16a, 16b, 16c and 16d each comprising three dots 11 for generating the three basic colours. Dots 11 are separated by masks 21 to obtain sharp and well-defined contours.

The dynamic pixels 18 should preferably be formed to comprise the same number of dots 11. The spatial arrangement of the different colour dots 13, 14, 15 is not critical. Pixels comprising only two basic colours in the form of dots, for example, would suffice for a less than full colour display of the kind shown in FIG. 1b.

FIGS. 4a and 4b show displays 10b and 10c formed of pixels 16a and 16b, with the increase in resolution being less pronounced than in the case of the aforesaid square form. FIG. 4a illustrates single color dots 11, and dynamic pixels 18 (shown as three ovals in the FIG.) shifting one color dot at a time horizontally. In addition, FIG. 4b illustrates single color dots 11, and dynamic pixels 18 shifting one color dot at a time vertically.

FIG. 5 shows a display 10 connected to control circuitry 19 through a network 20. Control circuitry 19 allows known dot-addressed displays to be used, of which the resolution will be increased by the invention.

In the inventive displays, each dot has a receiver of its own (not shown) to convert digital information transmitted through network 20 into luminous intensity levels for dots 11.

Network 20 preferably is an optical fibre network. Control circuitry 19 combines adjacent dots 11 to form a dynamic pixel 18 in order to then address these as a logical unit. Addressing involves high-frequency repetition, preferably at a rate of 100 Hz.

The inventive display can be used also for interlaced signals to combine the picture (frame) from even and odd fields 24, with odd field 24 composed of odd-numbered lines 22 and even field 24 of even-numbered lines 23.

Figure 7:
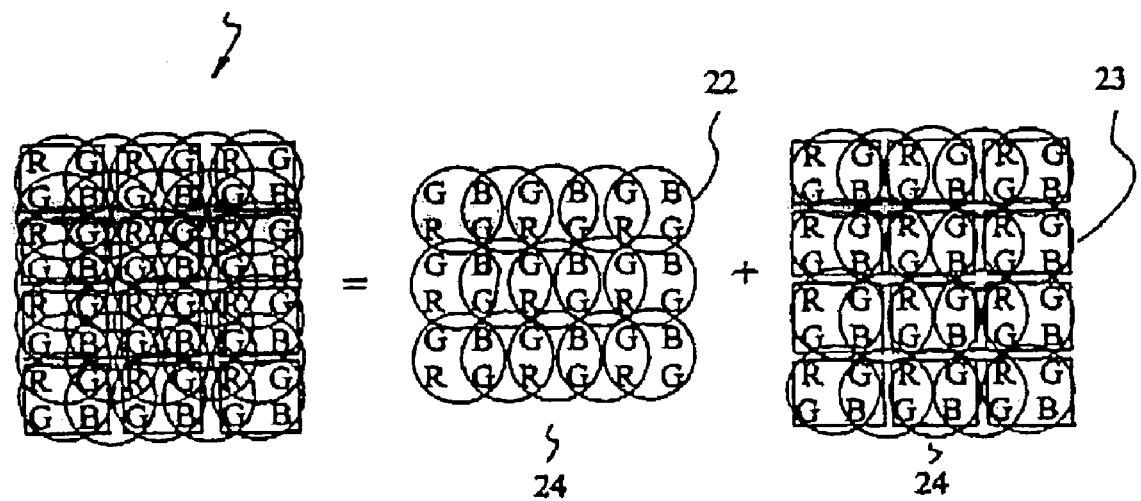
FIG. 7 shows the interlaced signal sequence in the generation of the inventive dynamic pixels.

The inertia of the human eye causes a picture to form which is composed of two fields 24. FIG. 6 shows the theoretical and FIG. 7 the inventive composition using dynamic pixels 18. Other pixel shapes are contemplated.

Figure 8:
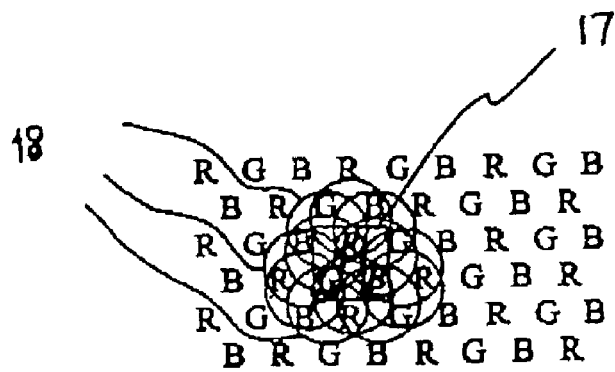
FIG. 8 shows a delta pixels display.

FIG. 8 shows a delta pixels display and wherein FIGS. 8.1 to 8.12 show twelve dynamic delta pixels 18 sharing common dots (individual elements) with a static delta pixel 17. FIGS. 8.1 to 8.12 illustrate sequentially shifting of the dynamic pixels horizontally and vertically so that one color dot at a time is shifted. For example, FIG. 8.1 shows dynamic pixel 18 containing color dots G, B, and R. When the dynamic pixel 18 is shifted from the position shown in FIG. 8.1 to the position shown in FIG. 8.2, only one single color dot (dot B) is shifted, and the two color dots (G and R) remain the same as in FIG. 8.1.

FIG. 9 shows a quad pixels display, wherein FIG. 9.1 to 9.8 show eight dynamic quad pixels 18 sharing common dots (individual elements) with a static quad pixel 17.

FIG. 10a shows a rectangle quad pixel where the crosspoint 33 is in the centre of the four dots (individual elements) of equal light emitting area and space, contoured by black mask or black barrier ribs 21 with the same structure.

FIG. 10b shows a typical rectangle quad pixel where the crosspoint 33 moving along the diagonal line 35 forms two dots (individual elements) of equal light emitting area and space 38 of green color (G).

FIG. 11a shows a square quad pixel where the crosspoint 33 is in the centre of the four dots (individual elements) of equal light emitting area and space, contoured by black mask or black barrier ribs 21 with the same structure.

FIG. 11b shows a typical square quad pixel where the crosspoint 33 moving along the diagonal line 35 forms two dots (individual elements) of equal light emitting area and space 38 of green color (G).

Figure 12:
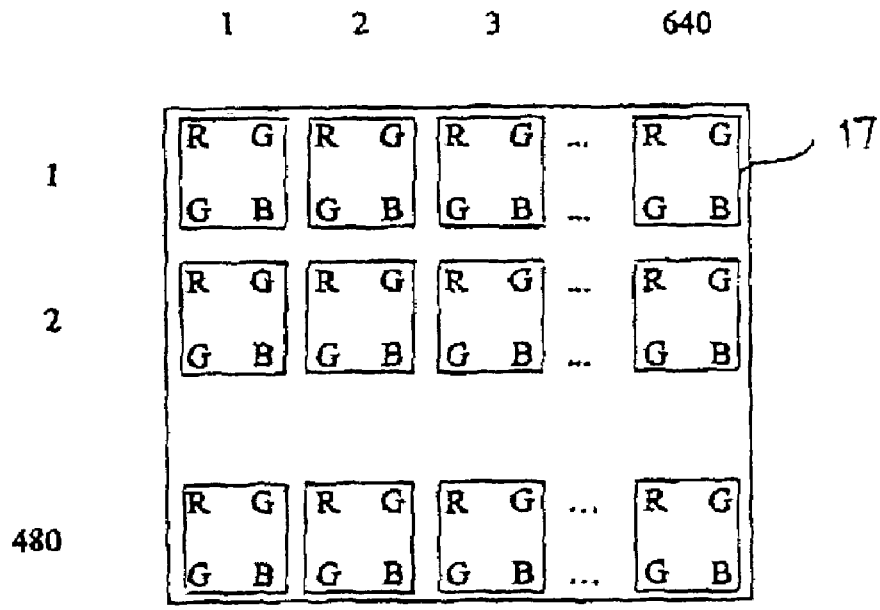
FIG. 12 shows a quad pixels display with a resolution of 480×640 static pixels.
Figure 12A:
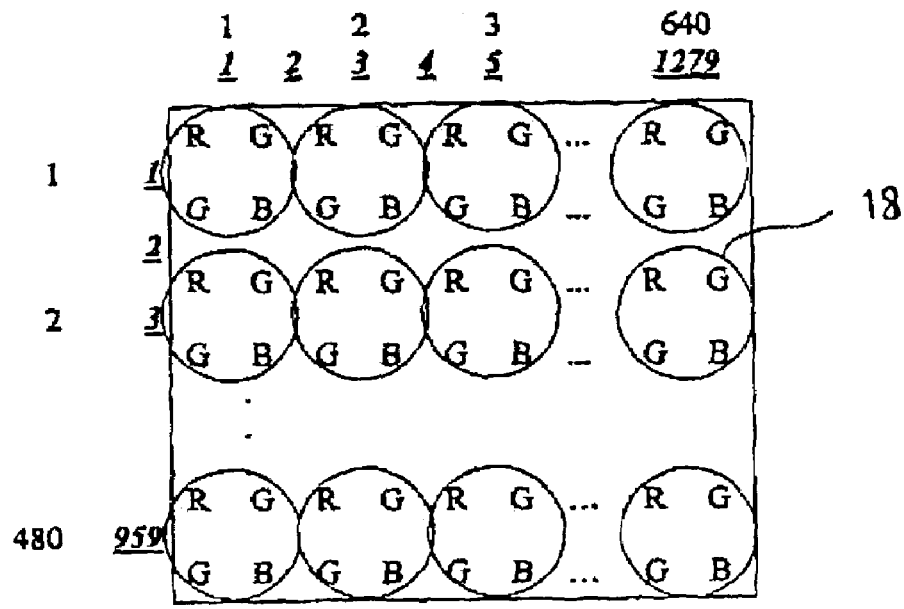
Figures 12B, 12C:
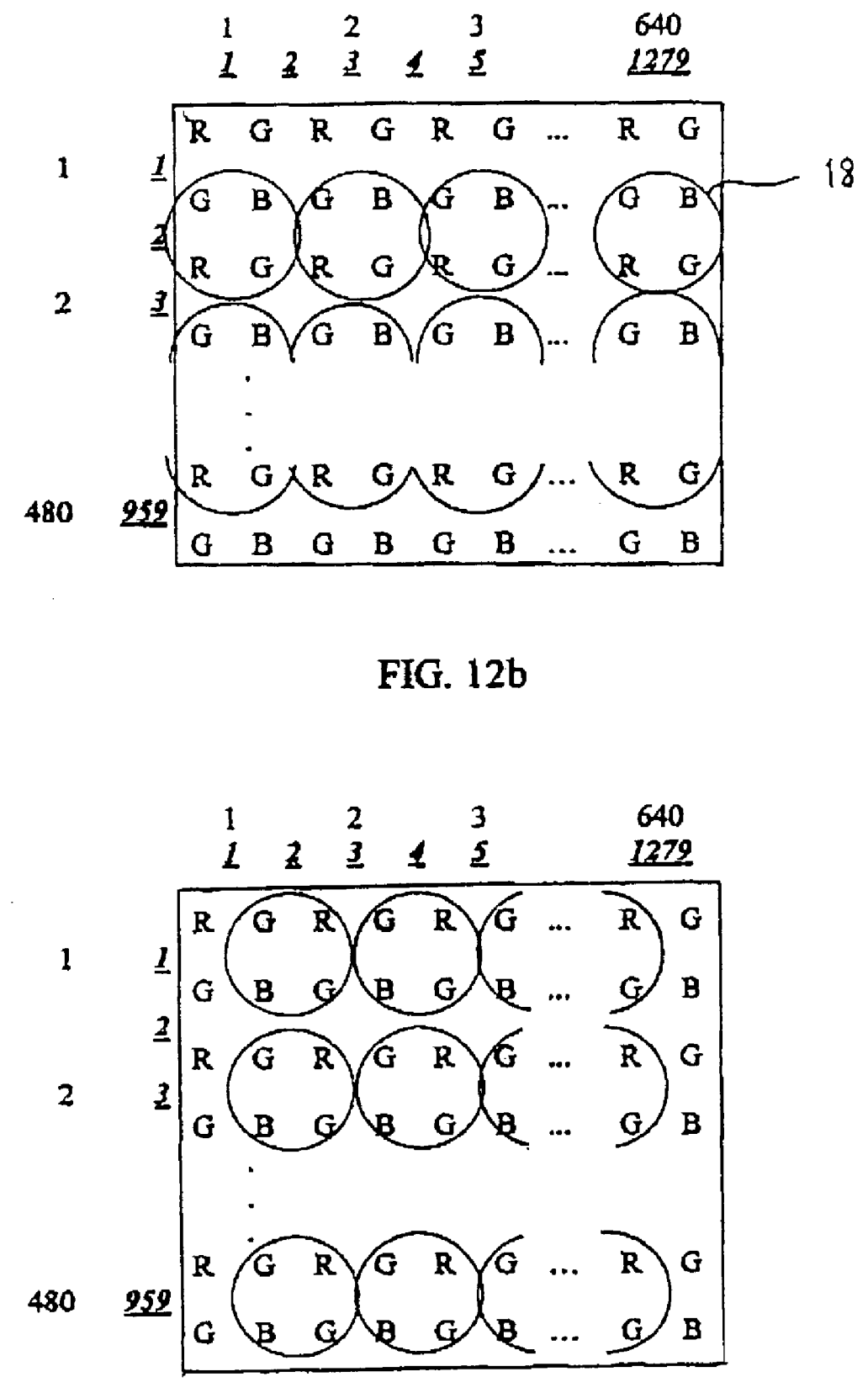
Figure 12D:
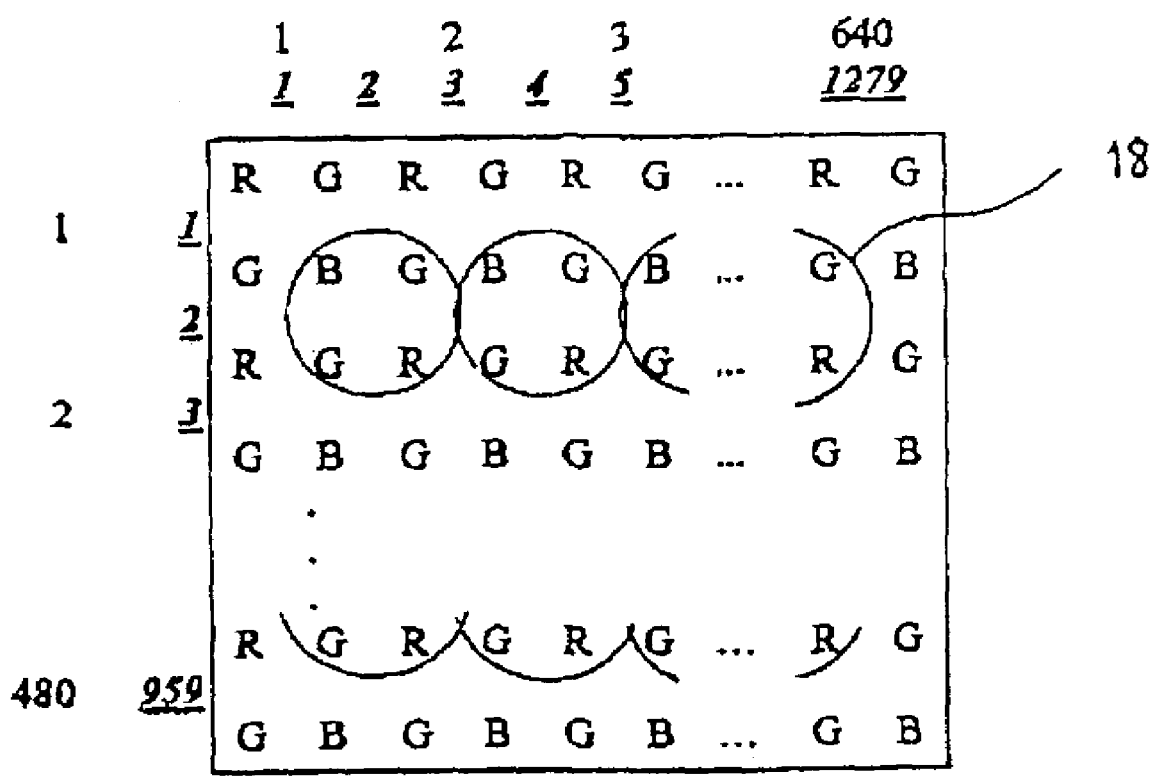

FIG. 12 shows a quad pixels display with a resolution of 480×640 static pixels 17 and wherein FIGS. 12a to 12d show a sequence of four dynamic screen layers of 480×640 resolution each which are displayed and superimposed subsequently over a time frame in order to obtain an enhanced high resolution screen of 959×1279 dynamic pixels 18.

With the present invention, displaying of video data from a high resolution video source, preferably an HDTV source, can be done by generating different subsets of dynamic, downscaling video data screen layers including different dynamic pixel groups which are subsequently displayed and superimposed each other over a time frame on a low resolution display to create an enhanced high resolution screen, preferably an HDTV screen.

Similarly, upscaling of video data from a low resolution video source, such as a SDTV source, can be done by generating different subsets of dynamic video data screen layers inclduing different dynamic pixel groups which are subsequently displayed and superimposed each other over a time frame on a low resolution display to create an enhanced high resolution screen, preferable an HDTV screen. In this situation, the data of the additional created dynamic pixels groups in the subsequent screen layers can be computed according to different predetermined Digital Signal Processing and Predicting (DSPP) algorithms, preferably using MPEG video data from the reference frame and target frames, in order to create sharper edges, fine details and better motion control of the original low resolution video source, such as a SDTV source.

Also, the dynamic high resolution display enhanced mode, preferably in HDTV resolution, can be switched back to the original, low resolution static mode to display computer text, preferable in a progressive scan mode, thus creating a perfect HDTV enabled WebTV set for video and internet access.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. A display, comprising
a plurality of static pixel groups, each static pixel group of the plurality of static pixel groups comprising a plurality individual elements grouped in a predetermined manner similar or identical to other static pixel groups in the plurality of static pixel groups; and
a plurality of dynamic pixel groups, at least one dynamic pixel group of the plurality of dynamic pixel groups comprises a plurality of individual elements selected from at least two adjacently situated pixel groups of the plurality of static pixel groups;
wherein each one of the plurality of static pixel groups does not share individual elements from other individual static pixel groups; and
wherein the dynamically-generated dynamic pixel groups are superimposed over the static pixel groups subsequently by shifting one single color dot vertically and/or horizontally, thus enabling an enhanced resolution in a vertical and/or a horizontal direction for a given resolution to be obtained for a given resolution for individual element addressed displays.

2. The display according to claim 1, wherein each static pixel group of the plurality of static pixel groups includes at least a red element, a green element, and a blue element.

3. The display according to claim 1, wherein each dynamic pixel group of the plurality of dynamic pixel groups includes at least a red element, a green element, and a blue element.

4. The display according to claim 1, at least one static pixel group comprises a first group of a predetermined number of the individual elements and at least one dynamic pixel group comprises a second group of the same predetermined number of individual elements, wherein the first and second groups include the same individual elements.

5. The display according to claim 1, wherein each dynamic pixel group of the plurality of dynamic pixel groups comprises the individual elements constituting another dynamic pixel group of the plurality of dynamic pixel groups.

6. The display according to claim 1,
wherein each static pixel group and each dynamic pixel group includes four of the individual elements thereby creating a quad pixel group wherein the light emitting area and space of each quad pixel group as well as of its individual elements are in the form of a rectangle or a square; and wherein the individual elements are aligned in straight lines in a matrix form.

7. The display according to claim 6, wherein three of the four individual elements in one pixel group include a red element, a green element, and a blue element, and wherein a fourth one of the four individual elements has the same color as one of the other three.

8. The display according to claim 6, at least one static pixel group comprises a first group of the four individual elements, and at least one dynamic pixel group comprises a second group of the same number of the individual elements, wherein the first and second groups include the same individual elements.

9. The display according to claim 6, wherein each dynamic pixel group of the plurality of dynamic pixel groups comprises the individual elements constituting another dynamic pixel group of the plurality of dynamic pixel groups.

10. The display according to claim 6, wherein the light emitting area and space of each of the individual elements in a given static quad pixel group can be determined in such a way that a cross point of the four individual elements moves along a diagonal line of the said pixel group to form at least two same color individual elements of equal light emitting area and space.

11. The display according to claim 7, wherein the two of the four individual elements have the same color and share equally the data of the said color data in the quad pixel group.

12. The display according to claim 1, wherein each static pixel group and each dynamic pixel group has three of the individual elements each;

wherein the individual elements are arranged in a mutually offset pattern, with two of the elements being arranged side by side, with the third element being centered above or below the two arranged side by side; and wherein any three neighboring individual elements form a delta pixel group.

13. The display according to claim 12, wherein the three individual elements in one pixel group include a red element, a green element, and a blue element.

14. The display according to claim 12, at least one static pixel group comprises a first group of three of the individual elements and at least one dynamic pixel group comprises a second group of the same number of the individual elements, wherein the first and second groups include the same individual elements.

15. The display according to claim 12, wherein each dynamic pixel group of the plurality of dynamic pixel groups comprises the individual elements constituting another dynamic pixel group of the plurality of dynamic pixel groups.

16. The display according to claim 1, further comprising a control unit for controlling a luminous intensity of each of the individual elements.

17. The display according to claim 1, wherein a determination of the light emitting area and space of each of the individual elements in each of the static pixel groups depends on a light emission performance of the said individual element.

18. The display according to claim 1, wherein a non light emitting area and space (black mask or black barrier ribs) contouring each of the individual elements has the same structure.

19. The display according to claim 1, wherein by adjusting the aperture ratio (a ratio of a light emitting area and space to a total display area and space or a percentage of an effective display area in a display panel), optimized luminance and contrast can be obtained in finding an optimal ratio between a non light emitting area (black mask or black barrier ribs) and the light emitting area to an acceptable level for human eyes.

20. The display according to claim 1, a light emitting area and space of each of the individual elements in each of the static pixel groups being adjusted and optimized in order to obtain a maximum luminance in white balance equilibrium.

21. A method for controlling a display, comprising the steps of:

generating a plurality of static pixel groups, each static pixel group of the plurality of static pixel groups comprising a plurality of individual elements grouped in a predetermined manner similar or identical to other static pixel groups in the plurality of static pixel groups; and generating a plurality of dynamic pixel groups, at least one dynamic pixel group of the plurality of dynamic pixel groups comprises a plurality of individual elements selected at least from two adjacently situated pixel groups of the plurality of static pixel groups;

wherein each one of the plurality of static pixel groups does not share individual elements from other individual static pixel groups; and wherein the dynamically-generated dynamic pixel groups are superimposed over the static pixel groups subsequently by shifting one single color dot vertically and/or horizontally, thus enabling an enhanced resolution in a vertical and/or a horizontal direction for a given resolution to be obtained for a given resolution for individual element addressed displays.

22. The method according to claim 21, wherein each static pixel group of the plurality of static pixel groups includes at least a red element, a green element, and a blue element.

23. The method according to claim 21, wherein each dynamic pixel group of the plurality of dynamic pixel groups includes at least a red element, a green element, and a blue element.

24. The method according to claim 21, wherein each dynamic pixel group of the plurality of dynamic pixel groups comprises the individual elements constituting another dynamic pixel group of the plurality of dynamic pixel groups.

25. The method according to claim 21, at least one static pixel group comprises a first group of a predetermined number of the individual elements and at least one dynamic pixel group comprises a second group of the same predetermined number of the individual elements, wherein the first and second groups include the same individual elements.

26. The method according to claim 21, further comprising the step of controlling a luminous energy of each of the individual elements.

27. The method according to claim 21, wherein displaying of video data from a high resolution video source can be done in by generating different subsets of dynamic, downscaling video data screen layers comprising different dynamic pixel groups which are subsequently displayed and superimposed each other over a time frame on a low resolution display to create an enhanced high resolution screen.

28. The method according to claim 21,
wherein upscaling of video data from a low resolution video source can be done in by generating different subsets of dynamic video data screen layers comprising different dynamic pixel groups which are subsequently displayed and superimposed each other over a time frame on a low resolution display to create an enhanced high resolution screen; and
wherein the data of the additional created dynamic pixels groups in the subsequent screen layers can be computed according to different predetermined Digital Signal Processing and Predicting (DSPP) algorithms, using video data from the reference frame and target frames, in order to create sharper edges, fine details and better motion control of an original low resolution video source.

29. The method according to claim 21, wherein dynamic high resolution display enhanced mode can be switched back to the original, low resolution static mode to display computer text, preferable in a progressive scan mode, thus creating a perfect HDTV enabled WebTV set for video and internet access.

30. The method according to claim 21,
wherein the upscaling of video data from a SDTV source can be done in generating different subsets of dynamic video data screen layers comprising different dynamic pixel groups which are subsequently displayed and superimposed each other over a time frame on a low resolution display to create an HDTV screen; and
wherein the data of the additional created dynamic pixels groups in the subsequent screen layers can be computed according to different predetermined Digital Signal Processing and Predicting (DSPP) algorithms, using video data from the reference frame and target frames, in order to create sharper edges, fine details and better motion control of an original SDTV source.

31. A display, comprising:
first pixels each including a plurality of dots grouped in a predetermined manner, wherein each group of dots grouped in a predetermined manner is formed similarly or identically; and
second pixels variably and dynamically generated from dots forming the first pixel groups, at least one second pixel includes a plurality of dots selected from at least two adjacently situated first pixels;
wherein each first pixel does not share common dots and
wherein the dynamically-generated second pixels are superimposed over the first pixels subsequently by shifting one single color dot vertically and/or horizontally, thus enabling an enhanced resolution in a vertical and/or a horizontal direction for a given resolution to be obtained for a given resolution for dot addressed displays.

* * * * *